United States Patent
Wilcox (10) Patent No.: US 7,917,096 B2
(45) Date of Patent: Mar. 29, 2011

(54) ANTENNA INTERFACE CIRCUITS INCLUDING MULTIPLE IMPEDANCE MATCHING NETWORKS THAT ARE RESPECTIVELY ASSOCIATED WITH MULTIPLE FREQUENCY BANDS AND ELECTRONIC DEVICES INCORPORATING THE SAME

(75) Inventor: Bruce E. Wilcox, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 857 days.

(21) Appl. No.: 11/731,668

(22) Filed: Mar. 30, 2007

(65) Prior Publication Data
US 2008/0238789 A1    Oct. 2, 2008

(51) Int. Cl.
*H04B 1/46* (2006.01)

(52) U.S. Cl. ........ 455/80; 455/78; 455/82; 455/83; 455/552.1; 455/553.1; 455/303; 455/307; 455/338; 455/340; 333/124; 333/126

(58) Field of Classification Search ........... 455/78–83, 455/552.1, 553.1, 95, 97, 192.1–192.3, 193.1–193.3, 455/121–125, 188.1, 191.1, 191.3, 303, 307, 455/338, 340; 333/124, 126
See application file for complete search history.

(56) References Cited

U.S. PATENT DOCUMENTS

| 5,973,568 | A  | * | 10/1999 | Shapiro et al. | 330/295 |
| 6,334,048 | B1 | * | 12/2001 | Edvardsson et al. | 455/575.7 |
| 6,816,711 | B2 | * | 11/2004 | Standke et al. | 455/73 |
| 6,985,712 | B2 | * | 1/2006  | Yamakawa et al. | 455/333 |
| 7,049,906 | B2 | * | 5/2006  | Wilcox | 333/126 |
| 2005/0205986 | A1 | * | 9/2005 | Ichitsubo et al. | 257/690 |
| 2005/0245228 | A1 | * | 11/2005 | Candal et al. | 455/347 |
| 2005/0266617 | A1 | * | 12/2005 | Ichitsubo et al. | 438/123 |

FOREIGN PATENT DOCUMENTS

EP    1536513 A1    6/2005
WO    WO 2006/014795 A1    2/2006

OTHER PUBLICATIONS

Notification of Transmittal of the International Search Report and The Written Opinion of the International Searching Authority for PCT/US2008/003862 dated Jul. 4, 2008.

* cited by examiner

*Primary Examiner* — Tuan A Tran
(74) *Attorney, Agent, or Firm* — Myers Bigel Sibley & Sajovec, P.A.

(57) ABSTRACT

An electronic device includes an antenna, a radio frequency circuit, and an impedance matching circuit that is connected between the antenna and the radio frequency circuit. The impedance matching circuit includes a plurality of impedance matching networks that are respectively associated with frequency bands used by the radio frequency circuit.

13 Claims, 6 Drawing Sheets

ANTENNA INTERFACE CIRCUITS INCLUDING MULTIPLE IMPEDANCE MATCHING NETWORKS THAT ARE RESPECTIVELY ASSOCIATED WITH MULTIPLE FREQUENCY BANDS AND ELECTRONIC DEVICES INCORPORATING THE SAME

BACKGROUND OF THE INVENTION

The present invention relates to wireless communication technology, and, more particularly, to antenna interface circuits and electronic devices incorporating the same.

Mobile terminals are widely used for voice and/or data communications. It is often desirable for a mobile terminal to transmit and receive over multiple frequency bands, for example, to provide both PCS and GSM capabilities. It may also be desirable to provide mobile terminals that operate over four radio frequency (RF) bands. For example, it may be desirable to provide a wireless terminal that can operate over the GSM850 band that is used in the United States (also referred to herein as GSM), the EGSM900 band that is used in Europe (also referred to herein as EGSM), the DCS1800 band that is used in Europe (also referred to herein as DCS) and the PCS1900 band that is used in the United States (also referred to herein as PCS). The transmit (TX) and receive (RX) frequencies of these bands are shown in Table 1:

TABLE 1

| Frequency Range | Band |
| --- | --- |
| 824 Mhz-849 Mhz | GSM850 TX Band: US |
| 869 Mhz-894 Mhz | GSM850 RX Band: US |
| 880 Mhz-915 Mhz | EGSM900 TX Band: Europe |
| 925 Mhz-960 Mhz | EGSM900 RX Band: Europe |
| 1710 Mhz-1785 Mhz | DCS1800 TX Band: Europe |
| 1805 Mhz-1880 Mhz | DCS1800 RX Band: Europe |
| 1850 Mhz-1910 Mhz | PCS1900 TX Band: US |
| 1930 Mhz-1990 Mhz | PCS1900 RX Band: US |

It may also be desirable for a mobile terminal to operate over multiple frequency bands used in third generation (3G) wireless technologies, such as the Universal Mobile Telephone System (UMTS). For example, Table 1 lists the transmit and receive frequency ranges for four bands used in UMTS networks:

TABLE 2

| Frequency Range | Band |
| --- | --- |
| 1920 MHz-1980 MHz | Band 1 transmit |
| 2110 Mhz-2170 Mhz | Band 1 receive |
| 1850 Mhz-1910 Mhz | Band 2 transmit |
| 1930 Mhz-1990 Mhz | Band 2 receive |
| 1710 Mhz-1785 Mhz | Band 3 transmit |
| 1805 Mhz-1880 Mhz | Band 3 receive |
| 824 Mhz-849 Mhz | Band 5 transmit |
| 869 Mhz-894 Mhz | Band 5 receive |

A quad band antenna interface module may be used to interface between an antenna port and the RF circuitry for the four bands. The design of the interface between the antenna port and the RF circuitry may play a role in achieving the published customer requirements and in providing a desired Over-The-Air (OTA) performance. Total Radiated Power (TRP) and Total Isotropic Sensitivity (TIS) are two figures of merit that define OTA performance. Both of these parameters are typically defined for the frequency band of interest. For a quad band device, the OTA performance is typically defined for eight frequency sub-bands.

Figure 1A:
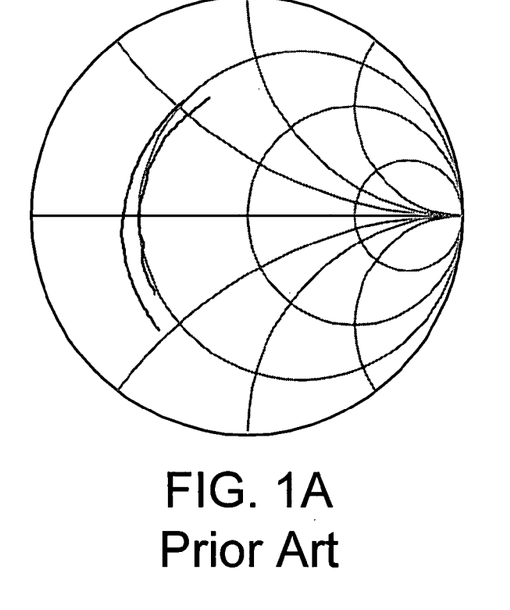
FIGS. 1A and 1B are Smith charts that illustrate the antenna feed-point impedance for a conventional mobile terminal for the 824 MHz-960 MHz frequency band and the 1.7 GHz-1.990 GHz frequency bands, respectively.
Figure 1B:
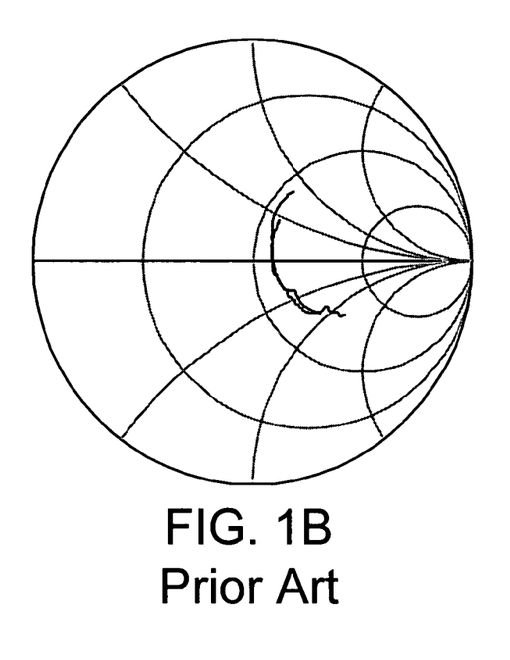

In many conventional mobile terminals, an antenna feed-point port is the location where the antenna connects to the RF circuitry. FIGS. 1A and 1B are Smith charts that illustrate the antenna feed-point impedance for a conventional mobile terminal for the 824 MHz-960 MHz frequency band and the 1.7 GHz-1.990 GHz frequency bands, respectively. Many mobile terminals include RF circuitry that is designed for a 50 ohm nominal system impedance. As can be seen from FIGS. 1A and 1B, the low-band impedance locus and the high-band impedance locus differ significantly. Impedance matching may, therefore, be used to improve OTA performance.

Figure 2:
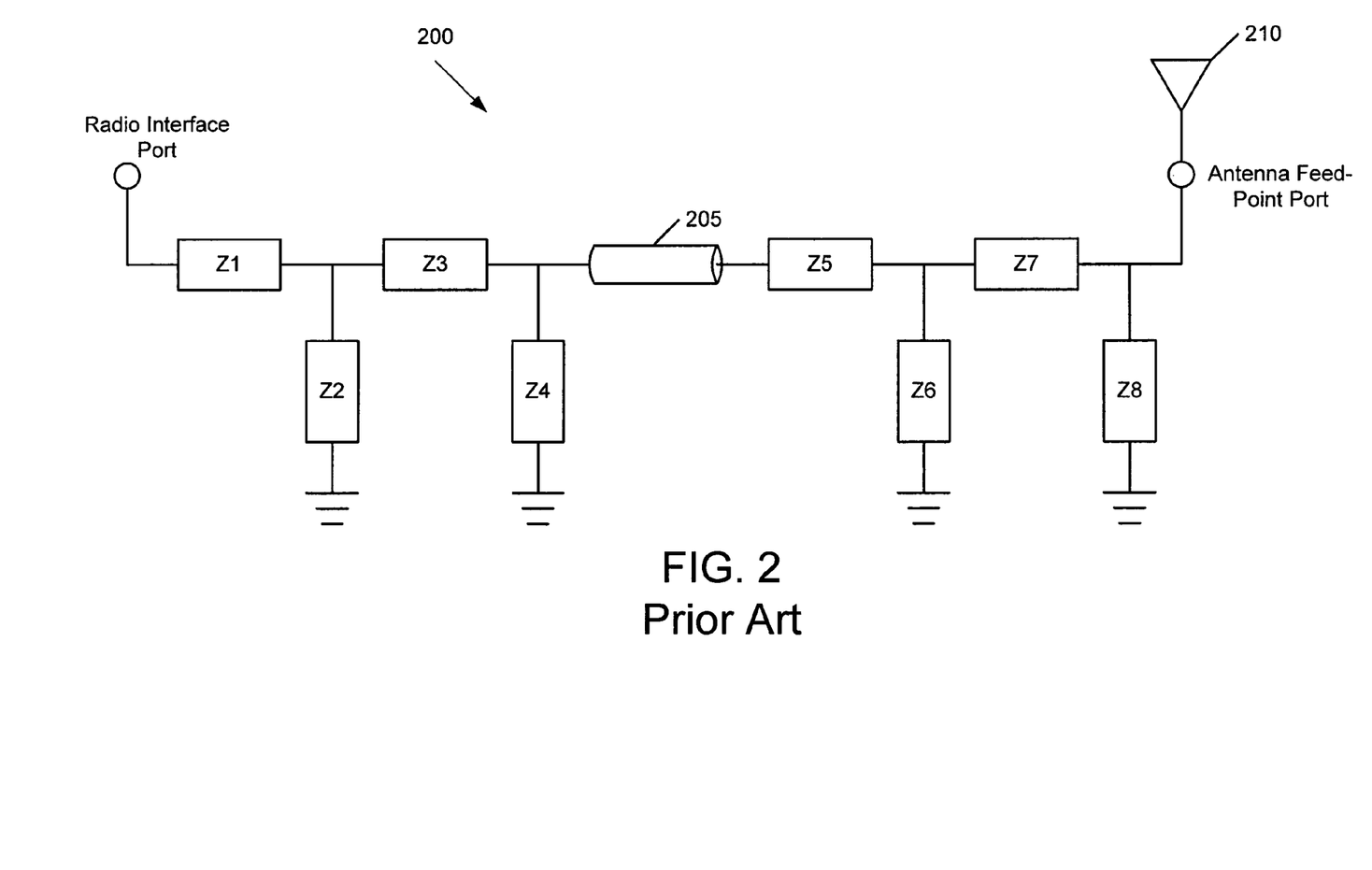
FIG. 2 is a circuit diagram that illustrates a conventional impedance matching circuit that may be used between a radio interface port and an antenna feed-point port.

FIG. 2 illustrates a conventional impedance matching circuit 200 that may be used between a radio interface port and an antenna feed-point port to connect an antenna 210 to RF circuitry in a mobile terminal. The impedance matching circuit 200 includes a plurality of impedance elements Z1 through Z8 along with a transmission line 205 that are configured as shown. As illustrated in FIGS. 1A and 1B above, the impedance that the impedance matching circuit 200 is designed to match varies based on frequency. As a result, the design of the impedance matching circuit 200 is typically based on a compromise to achieve an acceptable level of performance across multiple frequency bands, but may not provide the best possible performance for any specific frequency band. Such a design can be complex and potentially costly in terms of the amount of time involved to arrive at a design that provides acceptable performance. Moreover, the matching circuit 200 may consume a relatively large amount of area on a circuit board.

Figure 3:
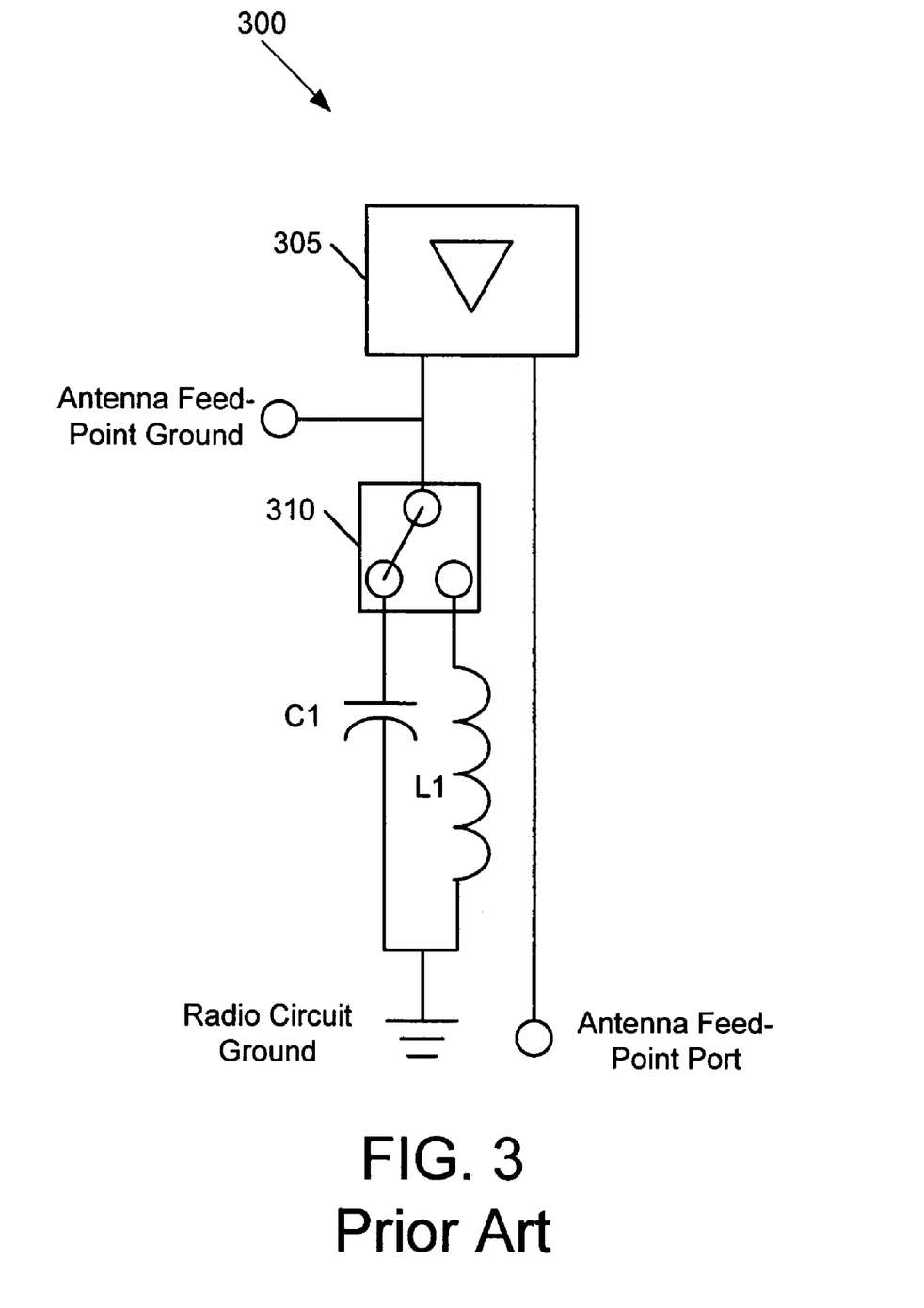
FIG. 3 is a circuit diagram that illustrates a conventional impedance matching circuit that may be used between the antenna feed-point ground for an antenna and the radio circuit ground.

FIG. 3 illustrates a conventional impedance matching circuit 300 that may be used between the antenna feed-point ground for an antenna 305 and the radio circuit ground. As shown in FIG. 3, the impedance matching circuit 300 includes a switch 310 that connects either a capacitor C1 or an inductor L1 between the antenna feed-point ground and the radio circuit ground. Unfortunately, the switch 310 is typically implemented using a transistor circuit, which can generate undesired RF harmonics resulting in increased Radiated Spurious Emissions (RSE). While the switch 310 can be implemented using a diode design, this may result in increased current usage and, as a result, may lessen the battery life in the mobile terminal.

SUMMARY OF THE INVENTION

According to some embodiments of the present invention, an antenna interface circuit includes an impedance matching circuit that includes a plurality of impedance matching networks that are respectively associated with frequency bands used in a wireless communication system.

In other embodiments, the frequency bands include a GSM850 band, a EGSM900 band, a DCS1800 band, and/or a PCS1900 band.

In other embodiments, the frequency bands include a plurality of UMTS frequency bands.

In still other embodiments, the plurality of impedance matching networks includes a first and a second matching network and the first impedance matching network is associated with frequencies less than about 1 GHz and the second impedance matching network is associated with frequencies greater than about 1.7 GHz.

In still other embodiments, the impedance matching networks are solely comprised of passive devices.

In still other embodiments, the antenna interface circuit further includes a diplexer circuit that is coupled to the impedance matching circuit.

In still other embodiments, the diplexer circuit includes a plurality of filter circuits that are respectively coupled to the plurality of impedance matching networks.

In still other embodiments, the diplexer circuit is a first diplexer circuit and the antenna interface circuit further includes a second diplexer circuit that is coupled to the impedance matching circuit.

In still other embodiments, the second diplexer circuit includes a plurality of filter circuits that are respectively coupled to the plurality of impedance matching networks.

In still other embodiments, the antenna interface circuit further includes a circuit board that has the first and second diplexer circuits and the impedance matching circuit disposed thereon.

In still other embodiments, the first and second diplexer circuits comprise discrete elements on the circuit board.

In still other embodiments, the first and second diplexer circuits comprise a ceramic surface mount device on the circuit board.

In still other embodiments, the first and second diplexer circuits comprise distributed elements in the circuit board.

In further embodiments of the present invention, an electronic device includes an antenna, a radio frequency circuit, and an impedance matching circuit that is connected between the antenna and the radio frequency circuit. The impedance matching circuit includes a plurality of impedance matching networks that are respectively associated with frequency bands used by the radio frequency circuit.

In still further embodiments, the frequency bands include a GSM850 band, a EGSM900 band, a DCS1800 band, and/or a PCS1900 band.

In still further embodiments, the frequency bands include a plurality of UMTS frequency bands.

In still further embodiments, the plurality of impedance matching networks includes a first and a second matching network, and the first impedance matching network is associated with frequencies less than about 1 GHz and the second impedance matching network is associated with frequencies greater than about 1.7 GHz.

In still further embodiments, the impedance matching networks are solely comprised of passive devices.

In still further embodiments, the electronic device further comprises a diplexer circuit that couples the impedance matching circuit to the radio frequency circuit.

In still further embodiments, the diplexer circuit includes a plurality of filter circuits that are respectively coupled to the plurality of impedance matching networks.

In still further embodiments, the antenna comprises a plurality of feed-point ports that are respectively coupled to the plurality of impedance matching networks.

In still further embodiments, the diplexer circuit is a first diplexer circuit and the electronic device further includes a second diplexer circuit that couples the impedance matching circuit to the antenna.

In still further embodiments, the second diplexer circuit includes a plurality of filter circuits that are respectively coupled to the plurality of impedance matching networks.

In still further embodiments, the electronic device further includes a circuit board that has the first and second diplexer circuits and the impedance matching circuit disposed thereon.

In still further embodiments, the first and second diplexer circuits comprise discrete elements on the circuit board.

In still further embodiments, the first and second diplexer circuits comprise a ceramic surface mount device on the circuit board.

In still further embodiments, the first and second diplexer circuits comprise distributed elements in the circuit board.

In still further embodiments, the electronic device is a mobile terminal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that includes an antenna for wireless communication.

Conventional impedance matching circuits and networks for use between an antenna feed-point port and may be difficult to design for a relatively broad frequency range while keeping current usage, RSE, chip/circuit board area, and/or design time within acceptable limits. Some embodiments of the present invention arise from a realization that an antenna interface circuit can include an impedance matching circuit in which multiple impedance matching networks are used that correspond to multiple frequency bands used in a wireless communication system. For example, in a quad band device that is designed to operate over the GSM850 band, the EGSM900 band, the DCS1800 band, and the PCS1900 band, a pair of impedance matching networks may be used that are associated with frequencies less than about 1 GHz and frequencies greater than about 1.7 GHz, respectively. Because each of the individual impedance matching networks need not be designed to cover all of the frequencies over which the quad band device may operate, the design of each impedance matching network may be simplified and each impedance matching network may provide improved impedance matching for the limited range of frequencies with which it is associated.

Figure 4:
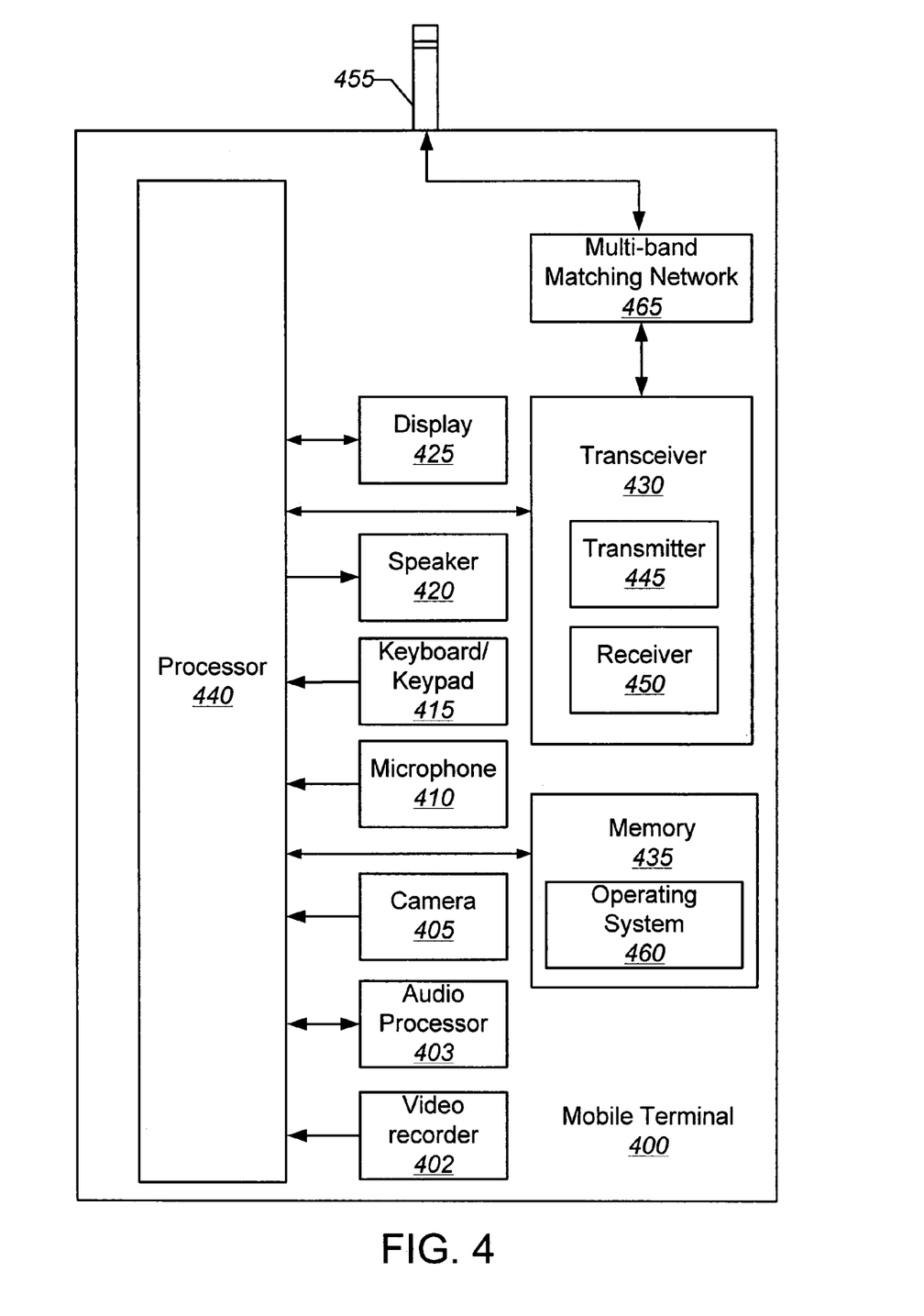
FIG. 4 is a block diagram that illustrates an electronic device/mobile terminal in accordance with some embodiments of the present invention.

Referring now to FIG. 4, a mobile terminal 400, in accordance with some embodiments of the present invention, includes a video recorder 402, an audio processor 403, a camera 405, a microphone 410, a keyboard/keypad 415, a speaker 420, a display 425, a transceiver 430, and a memory 435 that communicate with a processor 440. The transceiver 430 comprises a transmitter circuit 445 and a receiver circuit 450, which respectively transmit outgoing radio frequency signals to base station transceivers and receive incoming radio frequency signals from the base station transceivers via an antenna 455. The radio frequency signals transmitted between the mobile terminal 400 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. In accordance with various embodiments of the present invention, the mobile terminal 400 may communicate with the base station transceivers using one or more cellular communication protocols such as, for example, Advanced Mobile Phone Service (AMPS), ANSI-136, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS).

The foregoing components of the mobile terminal 400 may be included in many conventional mobile terminals and their functionality is generally known to those skilled in the art.

The processor 440 communicates with the memory 435 via an address/data bus. The processor 440 may be, for example, a commercially available or custom microprocessor. The memory 435 is representative of the one or more memory devices containing the software and data used to operate the mobile terminal 400. The memory 135 may include, but is not limited to, the following types of devices: cache, ROM, PROM, EPROM, EEPROM, flash, SRAM, and DRAM.

As shown in FIG. 4, the memory 435 may contain an operating system 460 that generally controls the operation of the mobile terminal 400. In particular, the operating system 465 may manage the mobile terminal's software and/or hardware resources and may coordinate execution of programs by the processor 440.

A multi-band matching network 465 may couple the antenna 455 to the transceiver 430. In some embodiments of the present invention, the multi-band switching network 465 may include a plurality of impedance matching networks that are respectively associated with frequency bands used by the mobile terminal 400 to communicate in a wireless communication system. By associating multiple impedance matching networks with defined frequency bands, the multi-band matching network 465 may provide improved OTA performance over that of a single impedance matching network that is designed to match an impedance over a broader frequency range. Various embodiments of antenna interface circuits that can be used to implement the multi-band matching network 465 of FIG. 4 will now be described with reference to FIGS. 5-7.

Figure 5:
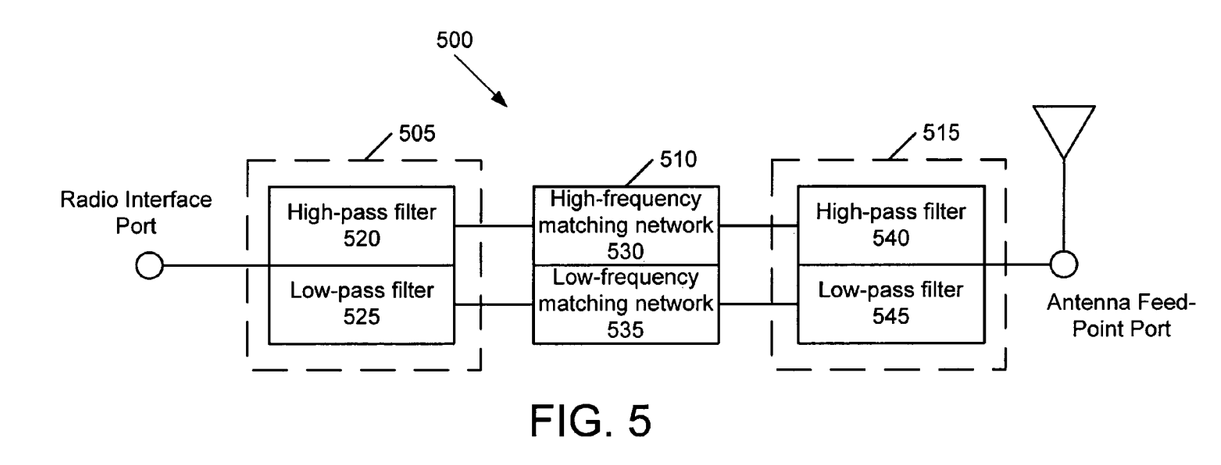
FIGS. 5-7 are block diagrams that illustrate antenna interface circuits in accordance with various embodiments of the present invention.

Referring to FIG. 5, an antenna interface circuit 500, in accordance with some embodiments of the present invention, includes a first diplexer circuit 505, impedance matching circuit 510, and second diplexer circuit 515 that are coupled in series between a radio interface port and an antenna feed-point port. The first diplexer circuit 505 includes a high-pass filter 520 and a low-pass filter 525 and is configured to separate frequencies of signals transmitted and received through the radio interface port into a high frequency band and a low frequency band. The impedance matching network 510 includes a high-frequency matching network 530 and a low-frequency matching network 535 that are respectively coupled to the high-pass filter 520 and the low-pass filter 525. As discussed above, the antenna feed-point impedance varies based on frequency. The high-frequency matching network 530 may be designed to provide impedance matching for the high frequency band impedance characteristic and the low-frequency matching network 535 may be designed to provide impedance matching for the low frequency band impedance characteristic. The second diplexer circuit 515 is similar to the first diplexer circuit 505 and includes a high-pass filter 540 and a low-pass filter 545 and is configured to separate frequencies of signals transmitted and received through the antenna feed-point port into the high frequency band and the low frequency band.

In accordance with particular embodiments of the present invention, the high frequency band may correspond to frequencies greater than about 1.7 GHz, which would cover the DCS1800 band and the PCS1900 band, and the low frequency band may correspond to frequencies less than about 1 GHz, which would cover the GSM850 band and the EGSM900 band. The thresholds for the high and low frequency bands may also be set so as to cover the UMTS frequency bands set forth in Table 2 above. For purposes of illustration, the antenna interface circuit 500 is described herein based on a division of frequencies into two bands: a high frequency band and a low frequency band. It will be understood that embodiments of the present invention are not limited to a two frequency band design, but may instead be designed generally based on a multiple frequency band division.

Figure 6:
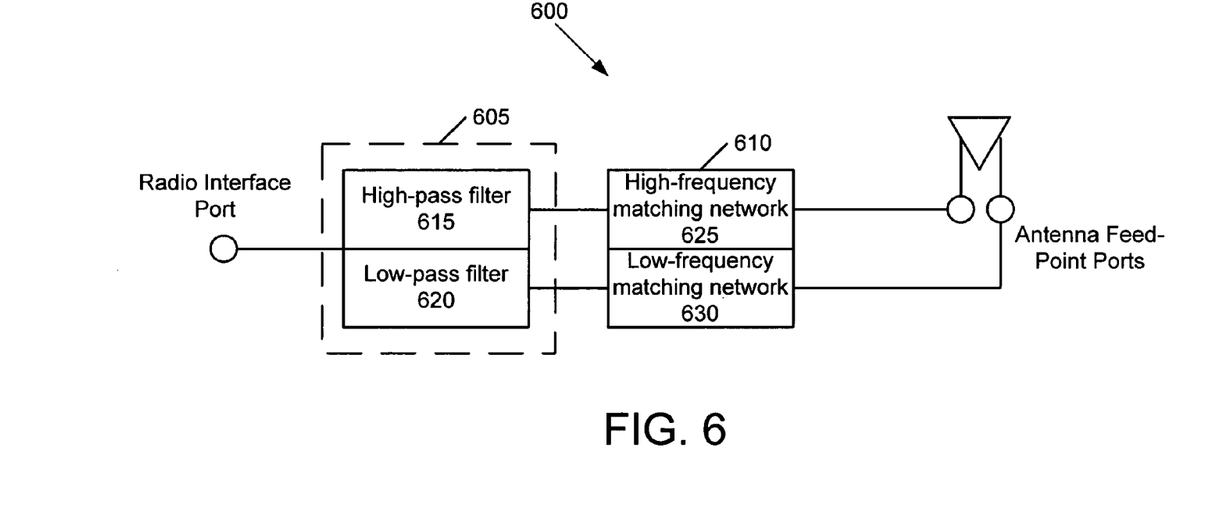
Figure 7:
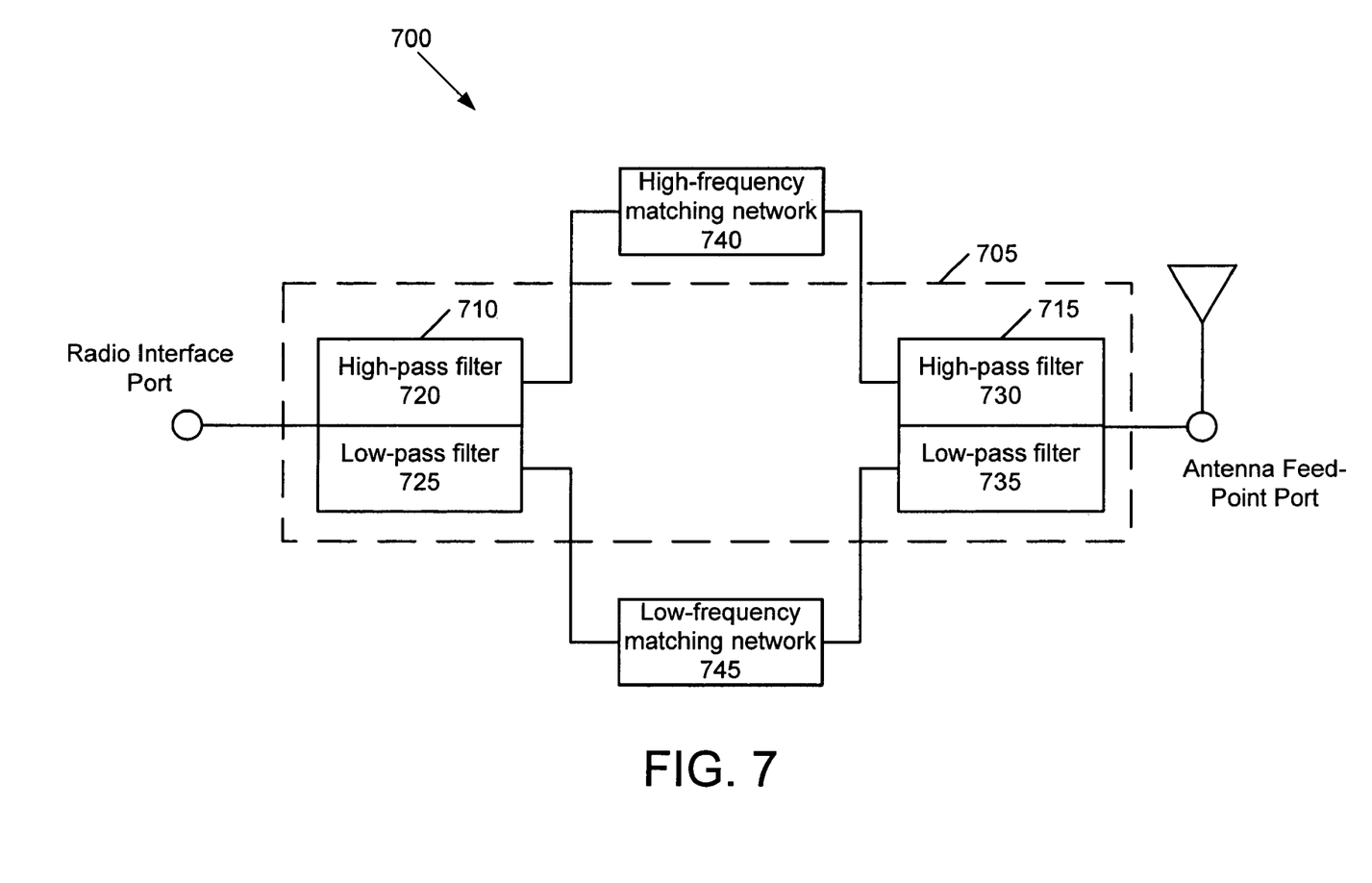

FIG. 6 illustrates an antenna interface circuit 600, in accordance with further embodiments of the present invention. The antenna interface circuit 600 is similar to the antenna interface circuit 500 described above with respect to FIG. 5 in that a diplexer circuit 605 includes a high-pass filter 615 and a low-pass filter 620 that correspond to the high-pass filter 520 and low-pass filter 525, respectively, of the first diplexer circuit 505. Likewise, an impedance matching circuit 610 includes a high-frequency matching network 625 and a low-frequency matching network 630 that correspond to the high-frequency matching network 530 and the low-frequency matching network 535, respectively, of the impedance matching circuit 510. Unlike the antenna interface circuit 500, however, the antenna interface circuit 600 does not include a second diplexer circuit as the antenna includes a pair of antenna feed-point ports that respectively correspond to the high and low frequency matching networks 625 and 630 used in the duel frequency band design of the impedance matching circuit 610.

The diplexer circuits and impedance matching circuits described above with respect to FIGS. 5 and 6 may be configured on a circuit board in accordance with various embodiments of the present invention. For example, the diplexer circuit(s) may comprise discrete elements on a circuit board, distributed elements in the circuit board, or a combination of both discrete and distributed elements. In other embodiments, the diplexer circuit(s) may comprise a ceramic surface mount device that is disposed on the circuit board. Ceramic surface mount device packaging may require less area on a circuit board than that required for packaged high-linearity switch devices, such as those illustrated above with respect to FIG. 3. This is illustrated, for example, in FIG. 7 in which a surface mount device 705 includes a first diplexer circuit 710, which includes a high-pass filter 720 and a low-pass filter 725, and a second diplexer circuit 715, which includes a high-pass filter 730 and a low-pass filter circuit 735. An impedance matching circuit includes a high-frequency matching network 740 and a low-frequency matching network 745, which are implemented outside of the diplexer circuit surface mount device 705. This configuration may be desirable because various mobile terminals may share the same diplexer circuitry, but may use different impedance matching circuitry based on the particular frequencies the mobile terminals use to communicate and the particular impedance characteristics at the antenna feed-point port(s) of the mobile terminals. In some embodiments, the impedance matching networks that comprise an impedance matching circuit may comprise only passive elements, thereby reducing the impact on battery life in a mobile terminal.

In contrast with conventional impedance matching approaches between a radio interface port and an antenna feed-point port in which a single impedance matching network is used that may include active devices, an impedance matching circuit, according to some embodiments of the present invention, may use a plurality of impedance matching networks so as to reduce the compromise made between OTA performance for various frequency bands. Moreover, the design of multiple, narrow band impedance matching networks that may be independently tuned may be less complex and require less design time than that of a single, wide band impedance matching network. Because the impedance matching networks may comprise solely passive devices in accordance with some embodiments of the present invention, RSE may not increase and Electrostatic Discharge (ESD) risk may not increase.

Many variations and modifications can be made to the embodiments without substantially departing from the principles of the present invention. All such variations and modifications are intended to be included herein within the scope of the present invention, as set forth in the following claims.

That which is claimed:

1. An electronic device, comprising:
    an antenna;
    a radio frequency circuit;
    an impedance matching circuit connected between the antenna and the radio frequency circuit that comprises a plurality of impedance matching networks that are respectively associated with frequency bands used by the radio frequency circuit; and
    first and second diplexer circuits that couple the impedance matching circuit to the radio frequency circuit.

2. The electronic device of claim 1, wherein the frequency bands comprise a GSM850 band, a EGSM900 band, a DCS1800 band, and/or a PCS1900 band.

3. The electronic device of claim 1, wherein the frequency bands comprise a plurality of UMTS frequency bands.

4. The electronic device of claim 1, wherein the plurality of impedance matching networks comprises a first and a second matching network; and
    wherein the first impedance matching network is associated with frequencies less than about 1 GHz and the second impedance matching network is associated with frequencies greater than about 1.7 GHz.

5. The electronic device of claim 1, wherein the impedance matching networks are solely comprised of passive devices.

6. The electronic device of claim 1, wherein the first diplexer circuit comprises a plurality of filter circuits that are respectively coupled to the plurality of impedance matching networks.

7. The electronic device of claim 1, wherein the antenna comprises a plurality of feed-point ports that are respectively coupled to the plurality of impedance matching networks.

8. The electronic device of claim 1, wherein the second diplexer circuit comprises a plurality of filter circuits that are respectively coupled to the plurality of impedance matching networks.

9. The electronic device of claim 1, further comprising:
    a circuit board that has the first and second diplexer circuits and the impedance matching circuit disposed thereon.

10. The electronic device of claim 9, wherein the first and second diplexer circuits comprise discrete elements on the circuit board.

11. The electronic device of claim 9, wherein the first and second diplexer circuits comprise a ceramic surface mount device on the circuit board.

12. The electronic device of claim 9, wherein the first and second diplexer circuits comprise distributed elements in the circuit board.

13. The electronic device of claim 1, wherein the electronic device is a mobile terminal.

* * * * *